United States Patent [19]

Guerro et al.

[11] Patent Number: 5,013,598

[45] Date of Patent: May 7, 1991

[54] METHOD OF MANUFACTURING A SAG-RESISTANT BONDED PARTICULATE ARTICLE

[75] Inventors: Gerald J. Guerro, Trumbull; Balwant Singh, Stamford, both of Conn.

[73] Assignee: American Cyanamid, Stamford, Conn.

[21] Appl. No.: 546,139

[22] Filed: Jun. 29, 1990

[51] Int. Cl.⁵ .............................................. B32B 5/16
[52] U.S. Cl. ................................. 428/283; 427/389.9; 428/288
[58] Field of Search ..................... 427/389.9; 428/283, 428/288

[56] References Cited

U.S. PATENT DOCUMENTS 4,158,574  6/1979  Cummisford et al. ................ 127/38

Primary Examiner—Michael Lusignan
Attorney, Agent, or Firm—Steven Flynn

[57] ABSTRACT

A method for the production of improved bonded particulate articles, and the articles so produced, are disclosed. Specifically, the manufacture of particulate articles having a reduced tendency to undergo humidity-induced sag is disclosed. These articles have utility in such application as ceiling tiles.

20 Claims, No Drawings

METHOD OF MANUFACTURING A SAG-RESISTANT BONDED PARTICULATE ARTICLE

FIELD OF THE INVENTION

This invention relates to a method of manufacturing improved bonded particulate articles and to the articles so produced. More particularly, the present invention relates to a method of manufacturing improved particulate articles, such as tiles, which possess a reduced tendency to exhibit humidity-induced sag and to the particulate articles so produced.

BACKGROUND OF THE INVENTION

Maintaining stiffness or rigidity of bonded particulate tile articles under high humidity conditions has long been a problem in the particulate tile industry. This problem is of particular concern since the articles are typically used in ceilings and supported only around their perimeters. Humidity weakens the tile and due to the perimeter-only support often induces an unacceptable sag of the tile.

The resistance of particulate tiles to moisture has previously been improved by applying a coating comprised of a melamine-formaldehyde resin. However, use of this resin, due to its formaldehyde content, is of concern due to the existence of regulations involving worker exposure during production of the resin and its application to the particulate tiles. Moreover, the environmental hazards associated with the use of this resin does not end with the manufacturing process since tiles bearing this coating release noxious and undesirable vapors under conditions such as those encountered in fires. Less noxious materials which exhibit satisfactory performance with regard to preventing humidity-induced sag of the particulate tiles to which they are applied have not heretofore been found.

U.S. Pat. No. 4,611,445 discloses a ceiling tile resistant to sag hen exposed to a fire comprising mineral wool fibers having distributed therein from about 1% to about 6% by weight, based on the weight of the fibers, of lithium carbonate or the fused decomposition product thereof. This coating, however, is not useful in preventing humidity-induced sag.

Various methods have been utilized in the corrugated paper art to reduce the degradation of paper strength due to moisture contact. Impregnating paper with certain resins, e.g. ureas, melamines, and phenolics, is known, but the use of such resins has only limited utility in the manufacturing of particulate tiles because these resins cure at normal paper machine temperatures and tiles coated therewith become excessively brittle during their processing. Moreover, many of these processes use coatings as noxious as those of which we seek to avoid to use.

U.S. Pat. No. 4,400,480 relates to a method of preparing water resistant paperboard through use of a cross-linking additive for starch-based adhesive compositions. These compositions are prepared by reacting acetone and formaldehyde under aqueous alkaline conditions at 20°–380° C. in a molar ratio of 1 mole acetone: 2–5.5 moles of formaldehyde. An effective amount of free formaldehyde is reduced to about 0.1–2% by weight. The resulting reaction product can then be added to a starch-based adhesive or first mixed with dimethylol dihydroxy ethylene urea. Due to its formaldehyde content, this resin has the same environmental and exposure concerns discussed earlier and therefore does not represent an improvement over the currently practiced art.

U.S. Pat. No. 4,600,439 discloses a coating composition for paper or cardboard, comprising a fluidizing agent and an undepolymerized starch, optionally modified, a synthetic product, such as polyvinylalcohol, or a protein, such as casein or soya proteins.

U.S. Pat. No. 3,858,273 discloses a method of improving the wet rigidity of corrugated paperboard through its impregnation with a slow-curing glyoxal-based resin in the presence of a catalyst and, optionally, an extender, such as a starch.

U.S. Pat. No. 3,288,631 discloses a method for the production of non-woven fiber webs that are stable in the presence of water comprising a water-soluble bonding agent having both hydroxyl- and carboxyl-groups and a water-soluble resin and metal salt capable of reacting with the aforementioned groups.

The above-mentioned paper coating methods are inadequate for use in the production of sag resistant tiles due to their failure to impart adequate moisture resistance and/or rigidity to a tile, thereby allowing the tile to exhibit an unacceptable degree of humidity-induced sag.

Commonly assigned U.S. patent application Ser. No. 07/433,984 is directed to a process for the prevention of humidity-induced sag in bonded particulate articles which discloses the application to at least one side of said article a coting composition comprising water, a filler material and a binder resin which is the reaction product of glyoxal resin and a starch. The coating composition is then cured on said article. While the particle of this process does adequately prevent humidity-induced sag in the particulate articles to which it is applied, the inclusion of starch, a polymeric substance, in the coating composition causes minor processing difficulties due to the relatively high viscosity which it imparts.

It is therefore the object of the present invention to provide a process for the production of a particulate article having adequate protection against humidity-induced sag without encounting processing difficulties due to high viscosity coating compositions.

SUMMARY OF THE INVENTION

The present invention relates to a method of preventing or minimizing humidity-induced sag in bonded particulate articles comprising applying to at least one side of a particulate substrate a relatively low viscosity coating composition comprising water, a binder resin comprising the reaction product of glyoxal resin or derivative thereof and a beta-hydroxy urethane, and a filler material and then curing the coating composition on said particulate substrate.

The present invention further relates to bonded particulate articles which are resistant to humidity-induced sag which are produced in accordance with the method claimed herein.

DETAILED DESCRIPTION

The substrates useful in the practice of the claimed are those such as those present in commercially available particulate tiles. These substrates are generally comprised of processed fiberous materials such as mineral wool as disclosed in U.S. Pat. No. 4,611,445. These substrates can be found in commercially available dropped ceiling tiles currently used in residential construction.

The binder resin useful in the production of the coating composition and the practice of the present invention comprises resin component and a starch component. The resin component of this invention may be any suitable slow-curing glyoxal resin or derivative thereof. Examples include the reaction product of glyoxal, urea, and formaldehyde. This component may be prepared, for example, by first heating the glyoxal resin and the urea to form a monourein which is then treated with formaldehyde or by reacting glyoxal and formaldehyde and then adding the urea. Typical compounds useful as the resin component include, but are not limited to, dimethylol dihydroxy ethylene urea, partially alkylated dimethylol dihydroxy ethylene urea wherein said alkyl group contain from 1 to about 8 carbon atoms, alkylated dimethylol dihydroxy ethylene urea wherein said alkyl group contain from 1 to about 8 carbon atoms, and tetramethylol glycoluril. Preferred are dimethylol dihydroxy ethylene urea and tetramethylol glycoluril.

DETAILED DESCRIPTION OF THE INVENTION

I. THE NOVEL BINDER COMPOSITIONS OF THE INVENTION

The binder composition of the invention contains two essential ingredients, namely, (i) a beta-hydroxy urethane functional material, and (ii) a polycarboxylic acid.

The beta-hydroxy urethane containing materials are characterized by the general structure:

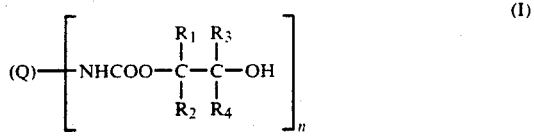

wherein R1, R2, R3, or R4 may be the same or different and are hydrogen or alkyl radicals, n is an integer of 2 or more and preferably 3 or more, and Q is any molecular backbone appended to it so as to produce the structure (I).

A preferred class of beta-hydroxy urethane materials is described in U.S. Pat. No. 4,708,984 the disclosure of which is incorporated herein by reference. A particularly preferred beta-hydroxy urethane material is a statistical distribution of poly(hydroxypropylcarbamylmethyl)melamines. The preparation of such mixtures is taught in U.S. Pat. No. 4,708,984.

In addition, beta-hydroxy urethanes suitable for the practice of this invention are described in the following patents:

U.S. Pat. No. 4,110,667
U.S. Pat. No. 4,284,750
U.S. Pat. No. 4,419,407
U.S. Pat. No. 4,435,559
U.S. Pat. No. 4,451,622
U.S. Pat. No. 4,533,704
U.S. Pat. No. 4,535,132
U.S. Pat. No. 4,542,173
U.S. Pat. No. 4,588,787
EPO Patent Appln. No. 280815

Suitable beta-hydroxy urethanes also include the following:

1. triazine compounds of the formula

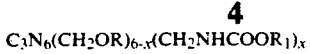

2. benzoguanamine compounds of the formula

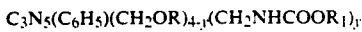

3. glycoluril compounds of the formula
$C_4H_2N_4O_2(CH_2OR)_{4-y}(CH_2NHCOOR_1)_y$ 4. acetoguanamine compounds of the formula
$C_3N_5(CH_3)(CH_2OR)_{4-y}(CH_2NHCOOR_1)_y$ 5. 4,5-dihydroxy-2-imidazolidone compounds of the formula $C_3H_4N_2O_3(CH_2NHCOOR_1)_2$ 6. an oligomer of (1) or (2) or (3) or (4) or (5);
wherein the R groups are, independently, hydrogen or alkyl from 1 to 12 carbon atoms, and the $R_1$ groups are, independently, beta-hydroxyalkyl, of from 2 to 18 carbon atoms, alone, or combined with alkyl of from 1 to 18 carbon atoms, x is in the range of from about 2 to 6, and y is in the range of from about 2 to 4.

These beta-hydroxy urethane containing materials are self-crosslinking since they contain both reactive hydroxyl and blocked isocyanate groups. Illustrative beta-hydroxy urethane compounds suitable for preparing the formulations of this invention are the following:
hydroxypropyl carbamylmethylated melamine
hydroxyethyl carbamylmethylated melamine
hydroxypropyl carbamylethylated melamine
hydroxyethyl carbamylethylated melamine
hydroxypropyl carbamylmethylated benzoguanamine
hydroxyethyl carbamylmethylated benzoguanamine
tetrahydroxypropyl carbamylethylate mono-chloro triazine
tetrahydroxyethyl carbamylethylated mono-chloro triazine
tetrahydroxypropyl carbamylamethylated glycoluril
tetrahydroxyethyl carbamylmethylated gylcoluril
dihydroxypropyl carbamylmethylated dihydroxyimidazidone
dihydroxyethyl carbamyimethylated dihydroxy imidazolidone
and are further illustrated by the compounds:
hexa-(hydroxypropyl carbamylmethylated) melamine
hexa-(hydroxypropyl carbamylethylated) melamine,
1-chloro-3,5,bis-(hydroxypropyl carbamylethylated) amino) triazine
1,7-di(hydroxypropyl carbamylethylated) diethylenetriamine
1,10,-di(hydroxypropyl carbamylethylated) triethylenetetraamine The fillers useful in the practice of the instant invention are not critical and may comprise organic fillers, inorganic fillers or mixtures thereof. They may generally be selected from such materials as alumina silicates, alkali metal carbonates, clays, silica, mineral wools and mixtures thereof, many of which are commercially available. Preferred are fillers with low acid demand. Most preferred are fillers such as silica, kaolin, bentonite, mineral wools and clays.

The resin and urethane components of the binder resin are present in amounts ranging from about 1:3 to about 2:1 parts by weight. More preferably, they are present in amounts ranging from about 2:3 to about 3:2 on the same basis. Most preferably, they are present in equivalent amounts.

The coating composition may further comprise any one or a combination of a wide variety of acid or latent acid catalysts, such as for example metal salts, amine hydrochlorides, carboxylic acids, hydroxy-substituted carboxylic acids, alkoxy-substituted carboxylic acids, and the like, and mixtures thereof. Examples include, but are not limited to, magnesium chloride, magnesium nitrate hexahydrate, magnesium acetate tetrahydrate, zinc chloride, zinc nitrate, zinc borofluoride, zinc silicofluoride, zinc nitrate hexahydrate, zinc acetate dihydrate, ammonium chloride, ammonium nitrate, ammonium sulfate, ammonium phosphates, sodium hydrogen sulfate, potassium persulfate, strontium nitrate, zirconium acetate, zirconium ammonium carbonate, zirconium oxychloride, aluminum acetate, chromium acetate, tartaric acid, citric acid, oxalic acid, lactic acid, succinic acid, valeric acid, maleic acid, phosphoric acid, boric acid, sulfonic acid, perchloric acid, persulfuric acid, p-toluenesulfonic acid, methoxyacetic acid, hydroxybutyric acid, glycolic acid, the hydrochloride of 2-amino-2-methyl-1-propanol, and the like, and their mixtures. The catalyst is used in an amount ranging from about 1 to about 50, and preferably about 12 to about 15, percent based on the total weight of the binder resin.

The coating compositions of this invention are aqueous dispersions prepared by mixing water, the binder resin components, and the catalyst if employed. The order of addition of these materials is not critical. The coating composition should contain 20–75 percent by weight of solids (i.e. binder resin and filler) and preferably 30–60 percent on the same basis.

The coating composition is applied to at least one side of the particulate substrate in the practice of the present invention. The coating composition should be applied such that subsequent to its curing, it forms a layer having a dry coating weight of at least about 1 to about 100 grams/ft$^2$ on said substrate. More preferably, the coating composition is present in a dry coating weight of at least about 5 to about 40 grams/ft$^2$.

Application of the coating composition to said substrate may be accomplished in a number of ways all well known is the art. For example, it may be sprayed on the substrate or applied to said substrate by way of roller(s) contacting both said coating composition and said substrate. The use of a combination of spray and roller application is further within the scope of the present invention.

The coated substrate is then heated to a temperature of about 200° to 700° F., preferably from about 250° to 375° F., for a time suitable to result in its cure. A time period of about 30 seconds to 4 minutes is suitable while a period of about 30 seconds to 2 minutes is preferred. As used herein, curing denotes the promotion of the formation of a reaction product of said urethane and the glyoxal resin or derivative thereof.

We claim:

1. A method of preventing or minimizing humidity-induced sag in bonded particulate substrates comprising applying to at least one side of said particulate substrate a coating composition comprising an aqueous dispersion of a mixture of an effective amount of a glyoxal resin or derivative thereof and an effective amount of a beta-hydroxy urethane compound, and an effective amount of a filler material, and curing said coating composition.

2. The method of claim 1 wherein said glyoxal resin of said coating composition is selected from the group consisting of dimethylol dihydroxy ethylene urea, partially akylated dimethylol dihydroxy ethylene urea alkylated dimethylol dihydroxy ethylene urea and tetramethylol glycoluril.

3. The method of claim 2 wherein the glyoxal resin is dimethylol dihydroxy ethylene urea.

4. The method of claim 1 wherein said substrate comprises processed fiberous material.

5. The method of claim 1 wherein said beta-hydroxy urethane compound is selected from the group consisting of a. triazine compounds of the formula

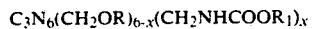

b. benzoguanamine compounds of the formula

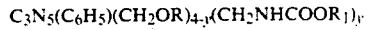

c. glycoluril compounds of the formula

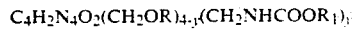

d. acetoguanamine compounds of the formula

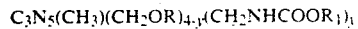

e. 4,5-dihydroxy-2-imidazolidone compounds of the formula

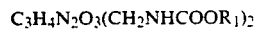

f. an oligomer of (a),
g. an oligomer of (b),
h. an oligomer of (c),
i. an oligomer of (d),
j. an oligomer of (e);

wherein the R groups are, independently, hydrogen or alkyl from 1 to 12 carbon atoms, and the $R_1$ groups are, independently, beta-hydroxyalkyl, of from 2 to 18 carbon atoms, alone, or combined with alkyl of from 1 to 18 carbon atoms, x is in the range of from about 2 to 6, and y is in the range of from about 2 to 4.

6. The method of claim 1 wherein said beta-hydroxy urethane compound is selected from the group consisting of hydroxypropyl carbamylmethylated melamine,
hydroxyethyl carbamylmethylated melamine,
hydroxypropyl carbamylethylated melamine,
hydroxyethyl carbamylethylated melamine,
phydroxypropyl carbamylmethylated benzoguanamine,
hydroxyethyl carbamylmethylated benzoguanamine,
tetrahydroxypropyl carbamylethylated mono-chloro triazine,
tetrahydroxyethyl carbamylethylated mono-chloro triazine
tetrahydroxypropyl carbamylmethylated glycoluril
tetrahydroxyethyl carbamylmethylated glycoluril
dihydroxypropyl carbamylmethylated dihydroxyimidazidone
dihydroxyethyl carbamylmethylated dihydroxy imidazolidone
hexa-(hydroxypropyl carbamylmethylated) melamine
hexa-(hydroxypropyl carbamylethylated) melamine, 1-chloro-3,5,bis-(hydroxypropyl carbamylethylated) amino) triazine, 1,7-di(hydroxypropyl carbamylethylated) diethylenetriamine, and 1,10,-di(hydroxypropyl carbamylethylated) triethylenetetraamine 7. The method of claim 1 said beta-hydroxy urethane compound is a poly(hydroxypropylcarbamylmethyl) melamine.

8. The method of claim 1 wherein the filler comprises an alumina silicate.

9. The method of claim 1 wherein the filler is selected from the group consisting of alkali metal carbonates, kaolin, bentonite, clays, silica, mineral wool and mixtures thereof.

10. The method of claim 1 wherein the filler is silica.

11. The method of claim 1 wherein the glyoxal resin and said beta-hydroxy urethane compound are present in amounts ranging from about 1:3 to about 2:1 by weight.

12. The method of claim 11 wherein the glyoxal resin and said beta-hydroxy urethane compound are present in amounts ranging from about 2:3 to about 3:2 by weight.

13. The method of claim 1 wherein the coating composition further comprises an acid catalyst which is present in amounts ranging from about 1 to about 50 weight percent based upon the weight of the glyoxal resin and said beta-hydroxy urethane compound.

14. The method of claim 13 wherein the catalyst is selected from the group consisting of zinc nitrate, zirconium ammonium carbonate, ammonium sulfate and mixtures thereof.

15. The method of claim 1 wherein the coating composition is applied to said substrate in quantities such that subsequent to its curing it will form a layer upon said substrate having a weight of about 1 to about 100 grams/ft$^2$.

16. The method of claim 15 wherein the coating composition is applied to said substrate in quantities such that subsequent to its curing it will form a layer upon said substrate having a weight of about 5 to about 40 grams/ft$^2$.

17. The method of claim 1 wherein curing of said coating composition is conducted at temperatures ranging from about 300° F. to about 700° F. for a period of between about 0.5 to about 4 minutes.

18. A method of preventing or minimizing humidity-induced sag in bonded particulate substrates a coating composition comprising an aqueous dispersion of a mixture of an effective amount of a resin selected from the group of dimethylol dihydroxy ethylene urea, tetramethylol glycoluril and mixtures thereof, an effective amount of beta-hydroxy urethane and an effective amount of a filler selected from the group consisting of kaolin, bentonite, clays, alkali metal carbonates and mixtures thereof, said dimethylol dihydroxy ethylene urea and starch being present in about a 1:1 weight % ratio and said composition being applied in quantities sufficient to result, upon curing, in a layer upon said substrate having a weight of about 5 to about 40 grams/ft$^2$ of substrate, and curing said composition at a temperature of between about 250° F. to about 375° F. for a time sufficient to result in curing of said composition.

19. A bonded particulate article resistant to humidity-induced sag produced in accordance with the method of claim 1.

20. A bonded -articulate article resistant to humidity-induced sag produced in accordance with the method of claim 18.

* * * * *

UNITED STATES PATENT AND TRADEMARK OFFICE
CERTIFICATE OF CORRECTION

PATENT NO. : 5,013,598

DATED : May 7, 1991

INVENTOR(S) : Gerald J. Guerro

It is certified that error appears in the above-identified patent and that said Letters Patent is hereby corrected as shown below:

Column 3, line 29, "(ii) a polycarboxylic acid" should read --a gloyoxal resin or derivative thereof--.

Signed and Sealed this

Nineteenth Day of November, 1991

Attest:

HARRY F. MANBECK, JR.

*Attesting Officer*        *Commissioner of Patents and Trademarks*